Oct. 4, 1949.  M. S. GIERA  2,483,696
FISHLINE REEL
Filed April 14, 1947
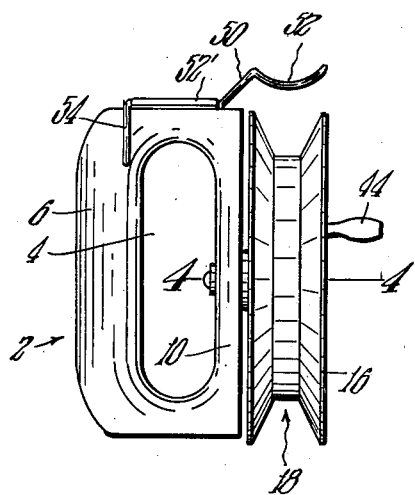
Fig. 2.
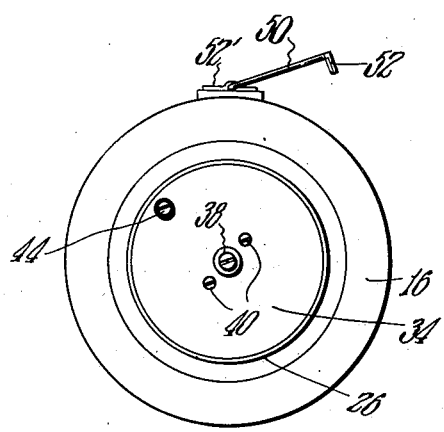
Fig. 1.
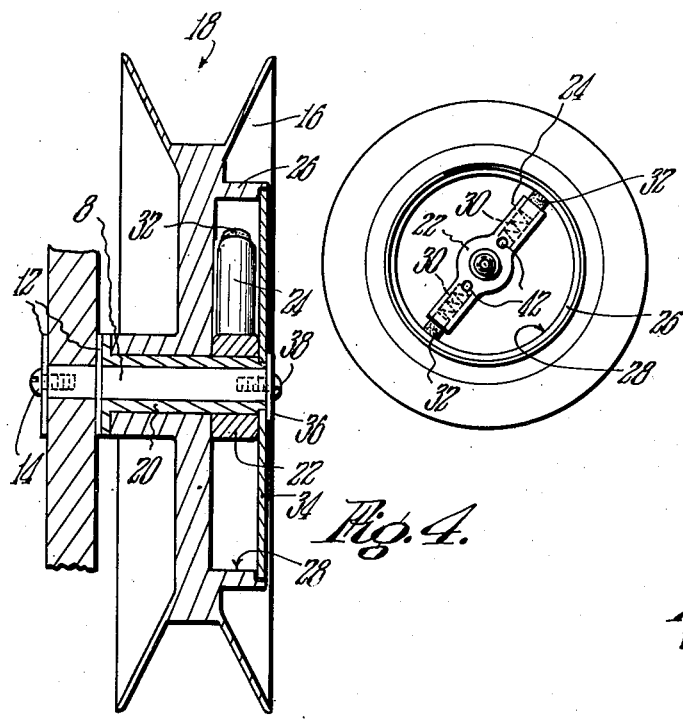
Fig. 3.
Fig. 4.
INVENTOR.
Max S. Giera.
BY Watts C. Ross.
Attorney.

Patented Oct. 4, 1949

2,483,696

UNITED STATES PATENT OFFICE 2,483,696

FISHLINE REEL

Max S. Giera, Chicopee, Mass., assignor of one-third to Joseph M. Lichwala, Springfield, Mass., and one-third to Theodore Brezowski, Chicopee, Mass.

Application April 14, 1947, Serial No. 741,221

2 Claims. (Cl. 242—99)

This invention relates to fish line reels.

The principal objects of the invention are the provisions of a reel for a fish line which is light in weight and adapted for general purposes such as casting, trolling and the like and which is characterized by means to frictionally resist the rotation of the line drum in paying-out of line.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are front and side elevational views of a reel device embodying novel features of the invention;

Fig. 3 is an elevational view of the drum of the invention with the closure plate removed; and Fig. 4 is a sectional elevational view on the line 4—4 of Fig. 2.

Referring now to the drawings more in detail, the invention will be fully described.

A handle 2 is provided which may be made from wood and which has an opening 4 therethrough to provide a grip portion 6. A shaft 8 extends through an outer forward part 10 of the handle and is arranged so as to be non-rotatable relative thereto. Washers 12 are provided and a screw 14 is in threaded engagement with the innermost end of the shaft 8.

A drum 16 has a circumferential groove 18 therearound in which a fish line may be wound with its innermost end secured in any suitable manner to the drum. A bushing 20 fixed in the drum is rotatable on the shaft 8 so that the drum is freely rotatable relative to shaft 8.

A hub member 22 is rotatable on the member 20 and has tubular arms 24 extending radially therefrom. An annular rim 26 extends outwardly from the drum and has a smooth inner peripheral wall surface 28.

Springs 30 disposed in the arms 24 yieldingly urge friction members 32 outwardly against the wall 28. The members 32 may be made from any suitable material such as leather or the like so as to frictionally engage the said wall 28.

A closure or cover member 34 is provided to overlie the rim 26 and it has a central opening rotatable on the end of the member 20, as shown. The peripheral edge of the member 34 is loose on the rim 26, all as shown, so that the members 16 and 34 are relatively rotatable.

A washer 36 is provided which is held against the end of shaft 8 and member 20 by a screw 28 in threaded engagement with said shaft. Screws 40 extend through the cover member 34 and are in engagement with tapped holes 42 provided in the arms 30. A manually engageable member 44 is carried by the cover member 34.

A guide 50 which may be made from wire is rotatable in a bracket 52' which is secured to the handle 2 and it has an outer curved end line guiding portion 52 and a manually engageable inner portion 54. The guide is swingable from the portion shown in Fig. 1 where the portion 52 thereof is disposed upwardly away from the drum 8 to a position adjacent the drum for guiding a fish line thereonto as it is being wound up.

With a fish line served around the drum and its inner end secured thereto the line may be cast or thrown therefrom. When it is desired to take up the line, the handle 44 is grasped and the member 34 is rotated thereby. The friction members 32 engage the wall of rim 26 to rotate the drum. When a strain occurs which is sufficient to overcome the frictional action of the members 32 on the rim 26 the drum may rotate relative to the member 34 while it is held against rotation. In other words, according to the arrangement of the springs and friction members the drum may under certain conditions rotate relative to the member 34.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A fish line reel apparatus comprising in combination, a support, a shaft fixed to and extending forwardly from said support, a drum rotatable on said shaft having an annular rim extending from the forward side thereof provided with an inner circumferential wall disposed concentrically relative to the axis of rotation of said drum, a hub within the confines of the rim rotatable relative to said drum having radially extending arms provided with longitudinal bores, friction members in and extending outwardly from said bores in engagement with said wall, springs in said bores urging said friction members outwardly, a cover plate over said rim having an outwardly projecting handle, and means securing said cover plate to said arms, all adapted and arranged whereby the support may be grasped in one hand and the handle of the cover member grasped by another hand for rotating it so that the drum is rotated through the friction members or the drum may be rotated relative to the cover member and against the action of the friction members by holding the cover member against rotation.

2. A fish line reel comprising in combination, a support, a shaft fixed to and extending forwardly from said support, a drum rotatable on said shaft having an annular rim extending from the forward side thereof and provided with an inner circumferential wall disposed concentrically relative to the axis of rotation of said drum, a hub within the confines of the rim rotatable relative to said drum having radially extending arms provided with longitudinal bores, friction members in and extending outwardly from the bores, springs in the bores urging said friction members outwardly, a cover plate over the rim having an outwardly projecting handle, and means securing said cover plate to the arms, all adapted and arranged whereby said support may be grasped in one hand and the handle of said cover plate may be grasped by another hand for rotating it so that said drum is rotated through said friction members or said drum may be rotated relative to said cover plate and against the action of said friction members by holding said cover member against rotation.

MAX S. GIERA.

No references cited.